Dec. 28, 1926.
O. S. HUBBARD
1,612,191
SPACING AND PULLING DEVICE FOR SERVICE CARS
Filed April 14, 1925 2 Sheets-Sheet 2
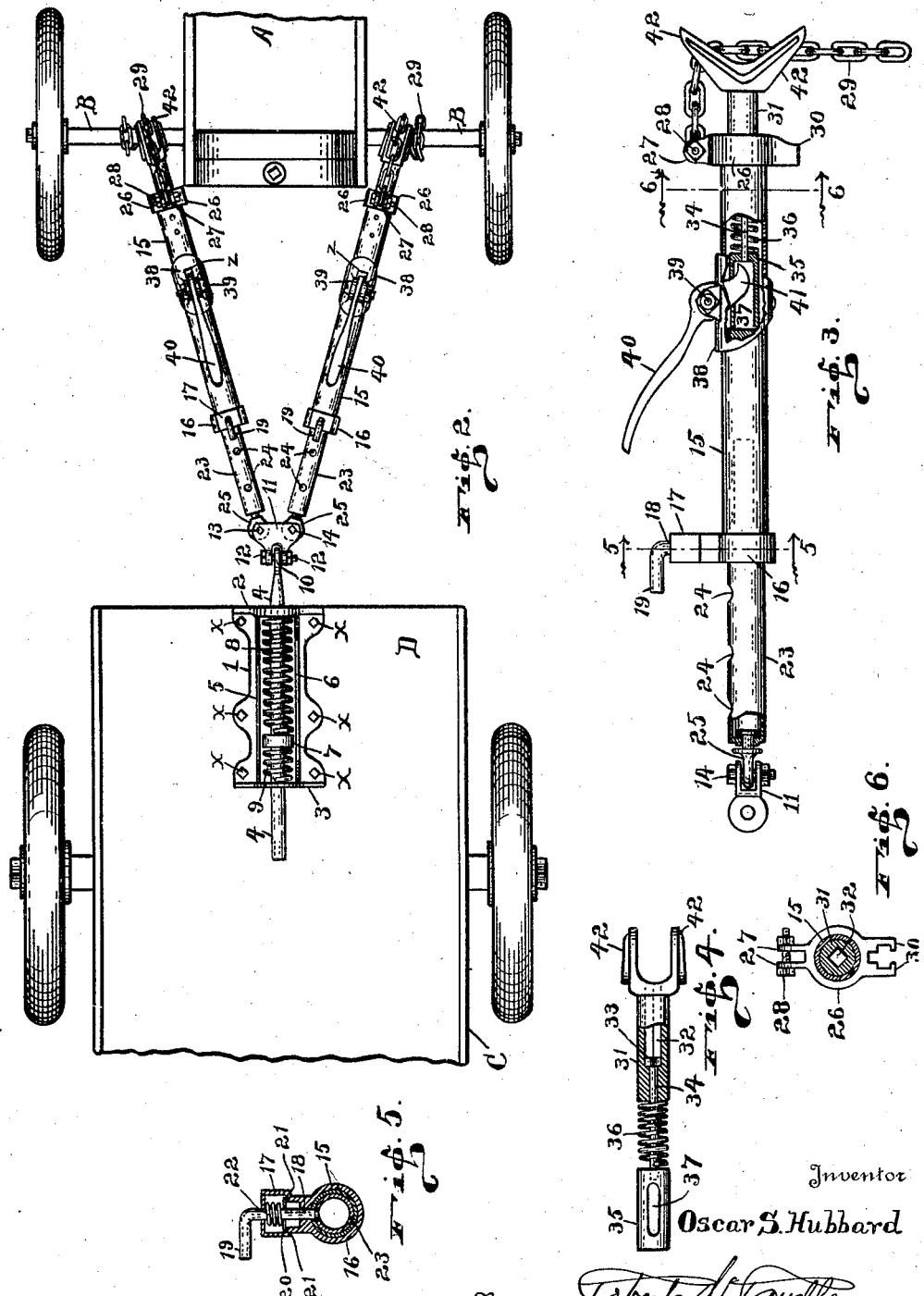
Inventor
Oscar S. Hubbard Patented Dec. 28, 1926.

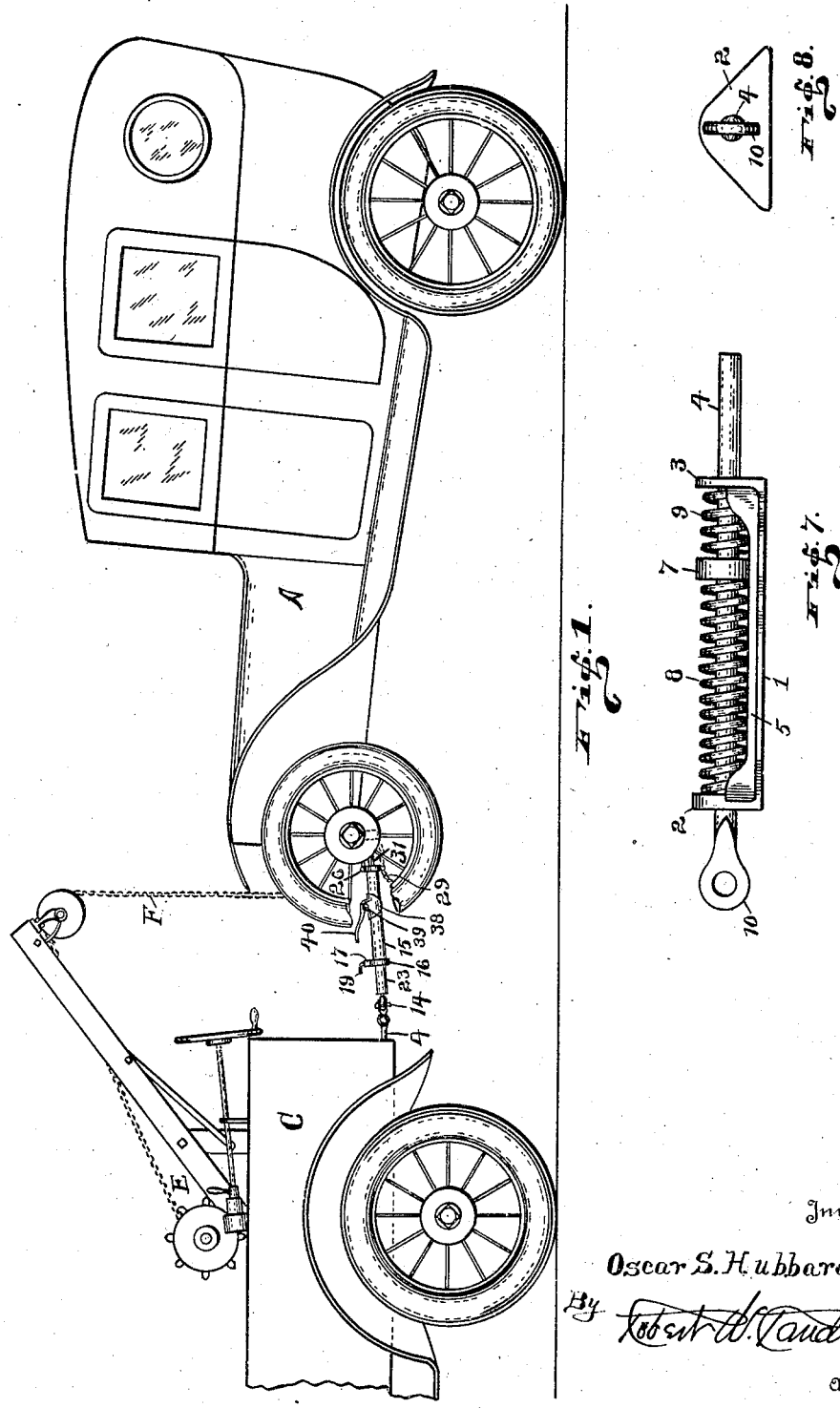

1,612,191

UNITED STATES PATENT OFFICE.

OSCAR S. HUBBARD, OF FARMLAND, INDIANA.

SPACING AND PULLING DEVICE FOR SERVICE CARS.

Application filed April 14, 1925. Serial No. 23,002.

The object of this present invention, broadly speaking, is to provide a device for connecting two automobiles in spaced relation, the same being simple in character, strong and durable in construction, easily placed in operative position, quickly detached, adjustable to meet varying conditions, positive in action, and which can be manufactured and sold at a comparatively low price.

More specifically stated, my object is to provide means for connecting a service or trouble car with an automobile which has become damaged in such manner that it can not be operated by its own power, said device being adapted to space the automobile from the rear end of the service car and at the same time providing the connecting means for pulling the automobile in the rear of the service car, and that without the need of the automobile being steered or guided by a person located therein.

Other minor objects and particular advantages of the invention will suggest themselves in the course of the following description, and that which is new will be correlated in the appended claims. The preferred means for carrying out the principle of my invention in a practical manner is shown in the accompanying drawings, in which—

Figure 1 is a side elevation of a disabled automobile, and a service car carrying a lifting device, showing the front of the automobile raised by the lifting device, and showing my invention in opertive position to retain the automobile the proper distance from the service car. Figure 2 is a plan view of the same. Figure 3 is an enlarged detail view of one of the spacing arms, in side elevation. Figure 4 is a detail of one of the jaws and its stem. Figure 5 is a cross section, as taken on the line 5—5 of Fig. 3. Figure 6 is a cross section, as taken on the line 6—6 of Fig. 3. Figure 7 is a side elevation of the fixed coupling device, and Figure 8 is an end elevation of the device shown in Fig. 7.

Similar indices denote like parts throughout the several views.

In order that the construction, the operation, and the advantages of the invention may be more fully understood and appreciated, I will now take up a detailed description thereof, in which I will set forth the same as comprehensively as I may.

In the drawings letter A denotes an automobile, having a front axle B. Letter C denotes the rear portion of a service car, of which letter D denotes the bottom or floor of the open end bed. Letter E denotes a lifting device mounted in the bed of the car C and extending rearward and upward therefrom, with a chain F operative thereby and extending down, to be detachably secured to an automobile in any well known manner.

My invention includes a coupling device, comprising a plate 1, adapted to be secured on the center of the rear portion of the floor D, as in Fig. 2, where it is secured by the bolts X. Integral with the plate 1 are the triangular end-members 2 and 3. Numeral 4 denotes the draft-rod, which is adapted to slide endwise freely through corresponding apertures formed through the end members 2 and 3. Also integral with the plate 1, and the end-members 2 and 3, are the spaced-apart ribs 5 and 6.

Secured around the rod 4 is the collar 7. Numeral 8 denotes the comparatively long coil-spring, which encircles the rod 4, with its ends in contact with the member 2 and the collar 7. A similar but short spring 9 surrounds the rod 4, with its ends in contact with the end member 3 and the collar 7. The rear end of the rod 4 terminates in the flat eyelet 10, to receive the lips of the clevis.

Numeral 11 denotes a three-way clevis, that is it has three pairs of lips, one pair of which is adapted to receive the eyelet 10 therebetween, where it is pivotally secured by the bolt 12. The other two pairs of lips of the clevis are directed rearward and apart, being on the same plane with relation to each other, but at right angles to the first pair of lips. Each of the rear pairs of lips of the clevis has a bolt therethrough, which bolts are designated by the numerals 13 and 14.

The arms and the remainder of the device are in duplicate, therefore a description of one will answer for both, the parts of one being denoted by the same numerals as the same parts of the other.

Each of said arms comprises a tubular body member 15, of any desired length. Secured around front end of the body 15 is the collar 16 which has on one side, the housing 17, through which operates the plunger 18 at right angles to the body 15. The outer portion of the plunger is turned at right angles to form a handle 19. A cross pin 20 extends through the plunger 18 with its ends adapted to rest on the shoulders 21, formed inside the housing, when the plunger is turned in one direction, but will not engage said shoulders when the plunger is turned at right angles to said first position. As shown in Fig. 5, a coil spring 22 surrounds the plunger 18, one end resting on the pin 20 and the other end in contact with the top of the housing 17, for pressing the plunger resiliently downward.

Numeral 23 denotes a tubular extension member which fits slidably inside the body member 15, and it has a plurality of apertures 24 formed through one side thereof at right angles thereto to receive the inner end of the plunger 18, as shown in Fig. 5.

Swivelly mounted in the outer (front) end of the member 23 is eyelet-head 25, which fits between one pair of the rear lips of the clevis 11, with the bolts 13—14 extending therethrough, as in Fig. 2.

Secured around the outer (rear) end of the body 15 is the collar 26, which has on one side a pair of spaced apart fingers 27, extending therefrom, with a bolt 28 extending across through said fingers, as shown in Fig. 6, with one end of the chain 29 secured on the bolt 28 between the fingers 27.

On the opposite side of the collar 26, from the fingers 27, there is a pair of oppositely disposed bifurcated fingers 30, which form a cruciform opening therebetween to receive any one of the links of said chain 29, but preventing said chain from sliding endwise therethrough after the chain is located therein.

Numeral 31 denotes a stem, which is adapted to slide inside the rear end of the body 15. Said stem has a square aperture 32 through a portion of its length to receive the head 33 of the bolt 34, whose stem portion is slidably mounted in an aperture forming a continuation of the aperture 32 but of less diameter, as shown in Fig. 4. Threaded on the protruding end of the stem of the bolt 34 is a plunger 35, which latter is of the same diameter as the stem 31, and it is also slidable in the body 15.

Surrounding the stem of the bolt 34 and contacting with the ends of the stem 31 and the plunger 35, is the helical spring 36.

Formed through the plunger 35, extending longitudinally thereof, is a slot 37.

Secured around on the periphery of the body 15 is the bracket 38 having a pair of ears through which is disposed the pivot bolt 39, there being a slot Z formed through the bracket between said ears, and a corresponding slot is formed through the body 15, which slots register with the slot 37, when the plunger 35 is moved to a certain position.

Mounted on the bolt 39 is the lever 40, which has an eccentric prong 41 adapted to enter the slot 37 whereby when the lever 40 is pressed toward the body 15 the plunger 35 will be forced back, holding it in that position even against the resiliency of the spring 36.

Rigidly secured on the outer (rear) end of the stem 31 is the angular forked double head 42, between each pair of forks of which the chain 29 is adapted to pass, as indicated in Fig. 3.

In practice the coupling device, shown in Fig. 7, is permanently secured in connection with the service-car, as shown in Fig. 2. Also the remainder of the construction, comprising the two divergent arms, may be brought together and turned forward on the bolt 12 allowing them to rest on the floor D ready for instant use.

For instance we will assume that the automobile A is injured in its front portion whereby the front wheels can not be used for its movement. Arriving at the place where the automobile A is to be taken on, the service car is brought to approximately the position in which it is shown in Fig. 1. The chain F is then attached to the front of the automobile and by the operation of the lifting device the front of the automobile is raised to clear the front wheels from the ground.

The arms of my device are now to be turned back and the heads 42 are then placed in position with the axle, or some other part of the automobile, in the forks of said heads. The chains 29 are next wound around the axle as tight as possible by hand, and the surplus chain is brought forward and secured by placing the most convenient links in the fingers 30. While this is being done it is to be understood that the lever 40 should be turned until the prong 41 is at substantially right angles to the tube 15, so that the plunger 35 can be pushed in a certain distance but will still have something to push against. Also that the lengths of the arms may be adjusted as desired, by lifting upward on the handle 19, giving them a quarter turn, to rest the pin 20 on the shoulders 21, which will hold the plungers 18 out of commission. The members 23 are then pulled out, or pushed in, as desired, after which the handle 19 is given a quarter turn which will release the plungers 18 and permit it to enter one of the apertures 24, where it will be retained by the spring 22. After the chain 29 has been secured, as above stated, then the lever 40 should be pressed down into contact, or nearly so, with the body 15, this will eventuate in pressing the stem 31, and therefore the head 42, rearward and thereby tightening the chain about the axle B, or whatever it is connected with, and thereby absolutely preventing its removal until the lever 40 is again turned upward, which of course will slacken the chain.

The automobile is now ready to be towed, traveling only on its rear wheels it will of course need no guiding but will follow the service car.

In a similar manner the device may be connected with the rear end of the automobile being towed, then towing it only upon its front wheels.

It is evident that the device will at all times retain the automobile at the proper distance from the service car, by which no damage can be done to either.

By reason of the cushioning means in the two arms (obtained by the springs 36) it is evident that the forward push of the automobile will be absorbed if the service car should stop suddenly.

Also both a forward and a rearward cushioning means is provided by reason of the springs 8 and 9 of the coupling device.

I desire that it be understood that various changes may be made in the several details herein set forth without departing from the spirit of the invention and without sacrificing any of the advantages thereof which are new and useful.

Having now fully shown and described my invention, what I claim, and desire to secure by Letters Patent of the United States, is—

A spacing and pulling device comprising a coupling means including a draft-bar, a pair of arms identical with each other connected to the draft bar and extending divergently rearward therefrom, each of said arms comprising a tubular body, a stem slidable in the rear end of the body with a square aperture formed through a portion of the length thereof, a bolt having a head slidable in said square aperture, a plunger threaded on the front end portion of said bolt with said plunger also slidable in said body, a helical spring surrounding said bolt and contacting with the opposing ends of the stem and the plunger, there being a slot formed through the plunger longitudinally thereof, a lever having an eccentric prong which extends through a slot in the body and is located in the slot of the plunger, means for mounting said lever to the body whereby it may be turned forward and rearward to operate the plunger, a head carried by the rear end of said stem, a collar carried by the rear end of the body, a chain secured at one end to said collar with its other end adapted to be detachably connected to said collar, with said chain adapted to pass around an axle which is being engaged by the head, all substantially as set forth.

In testimony whereof I have hereunto subscribed my name to this specification.

OSCAR S. HUBBARD.